United States Patent [19]

Krampitz

[11] Patent Number: 5,326,323
[45] Date of Patent: Jul. 5, 1994

[54] DEVICE FOR THE DAMPED TRANSFER OF THE ROTARY MOTION IN OVAL-WHEEL FLOWMETERS

[75] Inventor: Herbert Krampitz, Potsdam, Fed. Rep. of Germany

[73] Assignee: Daniel Industries Inc., Houston, Tex.

[21] Appl. No.: 934,875

[22] Filed: Aug. 21, 1992

[30] Foreign Application Priority Data

Aug. 22, 1991 [DE] Fed. Rep. of Germany ....... 4128795

[51] Int. Cl.⁵ .............................................. G01F 3/10
[52] U.S. Cl. ......................................... 464/29; 464/57
[58] Field of Search ........................... 464/29, 160, 57

[56] References Cited

U.S. PATENT DOCUMENTS

| 3,002,594 | 10/1961 | Haseler et al. | 464/57 X |
|---|---|---|---|
| 3,643,120 | 2/1972 | Young et al. | 464/29 X |
| 3,837,232 | 9/1974 | Fredell et al. | 464/29 X |
| 4,250,984 | 2/1981 | Hoylar et al. | 464/29 X |
| 4,934,990 | 6/1990 | Backers | 464/57 X |
| 4,953,517 | 9/1990 | McGovern et al. | 464/57 X |
| 5,086,900 | 2/1992 | Kikuta et al. | 464/57 X |
| 5,149,223 | 9/1992 | Wahs | 464/160 X |

FOREIGN PATENT DOCUMENTS 0143855  11/1981  Japan ...................... 464/29

Primary Examiner—Clifford D. Crowder
Assistant Examiner—John J. Calvert
Attorney, Agent, or Firm—Alton W. Payne; David M. O'Brian

[57] ABSTRACT

A stabilizing apparatus is provided for use with an oval gear meter. The oval gear meter for receiving material such that the quantity of material is measured by the meter. The meter having the characteristic of alternating acceleration and deceleration for a constant flow of material passing through the meter due to the eccentricity associated with the elliptic shape of the oval gear thereby causing excessive instability or oscillatory conditions with respect to the measured material. The stabilizing apparatus includes a first actuator secured to and synchronized rotationally with an oval gear. The first actuator receives rotational force from the oval gear representative of the quantity of material passing through the meter. A second actuator secured to and synchronized rotationally with a shaft. The second actuator is rotationally driven by force received from the first actuator for transferring rotational force to the shaft. A damping member in operative association with the first and second actuators such that the alternating acceleration and deceleration due to the eccentricity associated with the elliptic shape of the oval gear is smoothed to prevent excessive correction, instability or oscillatory conditions in the measured material.

11 Claims, 1 Drawing Sheet

DEVICE FOR THE DAMPED TRANSFER OF THE ROTARY MOTION IN OVAL-WHEEL FLOWMETERS

DESCRIPTION OF THE INVENTION

The invention concerns a device for the vibration-dampened transfer of the rotary motion in oval-wheel meters and oval gear flow meters that are used widely to measure the volume and flow rate of fluids.

The rotary motion of the oval drive wheels or oval gears are a known manner by means of a permanently magnetic coupling from the wet volume through the separation wall to the dry volume, from where it may be supplied to meters. In a first known design, e.g., in accordance with DDWP 117280, the oval drive wheel or gear is supported on a hollow shaft, in which a core magnet is placed that works together with a ring magnet attached to the oval wheel. The core magnet located in the dry volume is supported in a non-rotational manner on a shaft that transfers the rotary motion by means of suitable gears to the above-mentioned modules located downstream.

In a second design form, the rotary motion from the oval drive wheel gear is transferred by means of a gear that is generally located in the wet volume to the ring magnet that is also located in the wet volume, from which it is transferred to a core magnet supported in a cylindrical pressure unit that is connected solidly to the housing and acts as the separation wall.

The geometry of the oval wheel yields two acceleration and two deceleration phases for each rotation of the oval wheel at a constant medium throughflow. With higher throughflows, the rpm's of the oval wheels increase accordingly, thus causing an increase in the acceleration and deceleration. The constant and alternating occurrences of acceleration and deceleration as a function of the rpm of the oval wheels leads to vibrations and large mechanical forces in the system that transfers the measured values, thus causing most wear in the force-transfer units such as the spur wheels. The permanently magnetic couplings, particularly central couplings with their relatively large mass, produce a relatively large counter torque with the above-mentioned drive method, thus causing a possible break in the coupling effect. In the units that evaluate the measured values, the thus produced vibrations occurring in the units that transfer the measured values lead to erroneous evaluations in addition to the above-mentioned wear.

The tack of this invention thus consists in the development of a device for the vibration-damped transfer of the rotary motion in oval-wheel meters and oval gear flow meters that substantially reduces the above-mentioned effects caused by the acceleration and deceleration.

The advantages of the device in accordance with the invention are generally based on the fact that the acceleration forces are generally balanced with the deceleration forces and that the disadvantages described in the prior art are overcome to a large degree. A torsion spring is used in a preferred manner as the rotation-flexible element, in which case the theory of the invention is, however, by no means limited to such a spring. It is also possible to think of a rotation-flexible shaft made of rubber or another suitable material. Of importance is only the fact that said element allows a certain twisting of the corresponding force transfer elements corresponding to the described acceleration and deceleration forces and thus yields a substantial damping of these forces, subsequently producing a substantially more uniform rotational motion at both the spur wheels that are particularly prone to wear as well as at the magnetic coupling. In that manner, it is possible to substantially reduce the wear on the force transfer elements, particularly spur wheels, and to prevent a possible break in the magnet coupling.

This invention will be explained in the following with the help of different design examples.

SUMMARY OF THE INVENTION

The invention concerns a device for the vibration-damped transfer of the rotary motion in oval-wheel meters and oval gear flow meters that in accordance with the task substantially reduces the effects of accelerations and decelerations such as increased wear of the force-transfer elements and a possible break in the magnet coupling.

This is achieved by the fact that a rotation-flexible element is placed into the force flow between the oval wheel drive (1) and the driven shaft (5) of the magnet coupling; this has the effect that the drive and the driven shaft may rotate with respect to each other against a predetermined force and at a predetermined angle. The preferred element consists of a torsion spring that in the first design is placed in the dry volume and in hollow shaft 2 immediately between driven magnet 6 and driven shaft 5.

In a second design, torsion spring 7 is located between first and second force-transfer elements 10 or 13. First element 10 is driven by oval wheel 1 and by means of a gear and is supported in a rotating manner on shaft 12 attached centrally in housing wall 11. Second element 13 supports ring magnet 4 and is also supported in a rotating manner on shaft 12. The transfer of the rotary motion in the dry volume is achieved from ring magnet 4 by means of cylindrical pressure unit 14, attached in a sealing manner in the housing, to core magnet 6, attached in said housing to drive shaft 5.

DETAILED DESCRIPTION OF THE INVENTION

Figure 1:
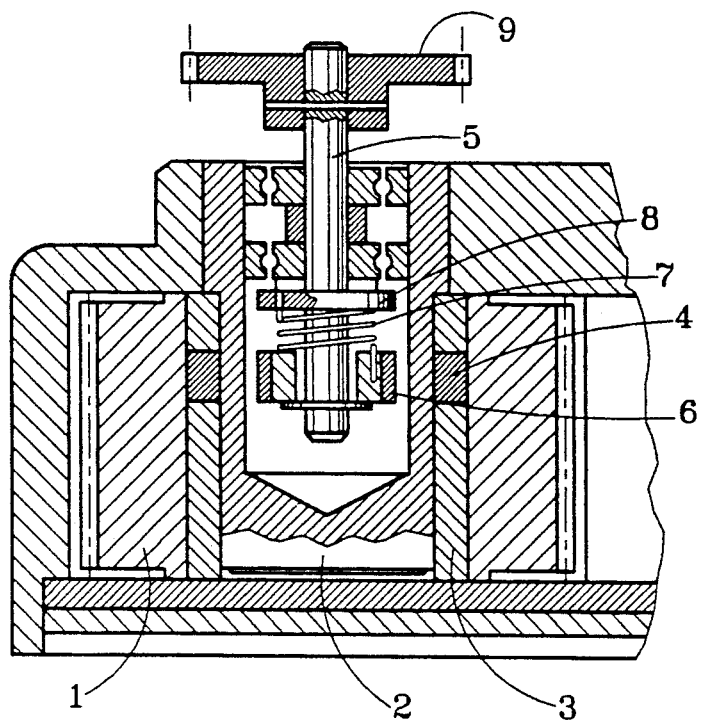
FIG. 1—an oval-wheel meter with a direct attachment of the drive magnet to the oval wheel and the eccentric driven unit.

As indicated in FIG. 1, oval drive wheel or oval gear 1 is supported on a hollow shaft 2 that simultaneously forms a separating wall 20 between the dry volume 22 and the wet volume 24. Ring or drive magnet 4 of the magnet coupling 26 is installed in a rotation-proof manner in bearing 3 of the oval wheel. The inside of the hollow shaft 2 supports a driven shaft 5, on which core magnet 6 is supported in a rotating manner, i.e., not connected solidly as in commonly used units, core magnet 6 then engages with ring magnet 4 to form the magnetic coupling 26. In accordance with the invention, core magnet 6 is connected by means of torsion spring 7 to attachment unit 8 which is attached solidly to shaft 5. The spur wheel is also attached to the shaft serves as the driven pinion for the downstream modules (not shown). The torsion spring is, in this design, located in the dry volume.

In a preferred manner, torsion spring 7 is attached directly to the driven magnet of the magnet coupling, in which manner said magnet is separated from the mass of the downstream elements including shaft 5, attachment unit 8 and spur wheel 9. The magnetic coupling is thus capable of allowing the drive magnet to rotate without allowing a break between the drive magnet and the driven magnet in the magnetic coupling. Torsion spring 7 dampens the vibrations in the force-transfer system and to a large degree and by means of the twisting motion between core magnet 6 and driven shaft 5 balances the acceleration and deceleration forces produced by the oval gear, thus achieving a harmonic rotary motion in the downstream elements.

Figure 2:
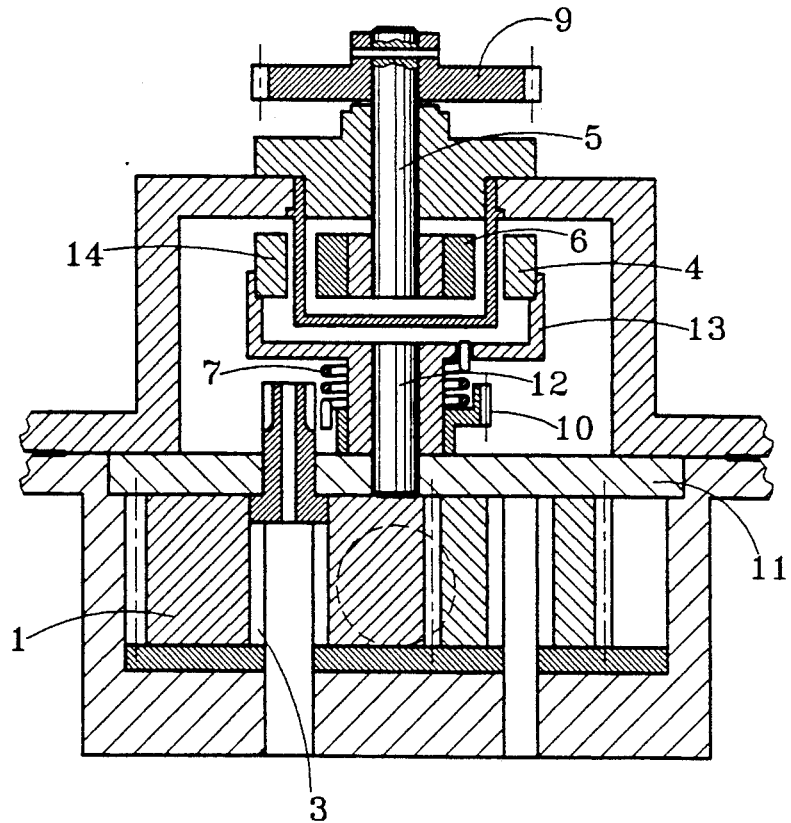
FIG. 2—an oval-wheel meter with a gear in the wet volume and a centrically driven unit.

FIG. 2 shows an additional design for this invention, in which the magnet coupling is not arranged directly at driven oval wheel 1. In this case, the rotary motion of oval wheel 1 is initially transferred in a central manner and by means of a second gear located in the wet volume to a first force-transfer element 10 that is attached in a rotating manner to shaft 12 arranged centrally in a housing wall. A second force-transfer element 13 is also supported on shaft 12 in a rotating manner and is connected at its outside periphery and in a solid manner to ring magnet 4 that is also and still located in the dry volume. Torsion spring 7 is located between the two above-mentioned force transfer elements. The sealing effect against the dry volume is achieved by means of cylindrical pressure unit 14 that is connected to the housing in a sealing manner and functions as the separation wall for the magnet coupling. On the inside of pressure unit 14, core magnet 6 is connected solidly to driven shaft 5 that in this design protrudes centrally from the housing. As in the design shown in FIG. 1, spur wheel 9 is attached in a rotation-proof manner to driven shaft 5 for the force transfer to the additional (not shown) modular groups. The operating characteristics of torsion spring 7 as a vibration-damping element is equal to that described in FIG. 1.

What is claimed is:

1. A stabilizing apparatus for use with an oval gear meter having one or more oval gears, the oval gear meter for receiving material such that a quantity of material is measured by the meter, such meter having the characteristic of alternating acceleration and deceleration for a constant flow of material passing through the meter due to the eccentricity associated with the elliptic shape of the oval gear thereby causing excessive instability or oscillatory conditions with respect to the measured material, the stabilizing apparatus comprising:
   (a) a first actuator operationally secured to and synchronized rotationally with an oval gear, said first actuator receiving rotational force from the oval gear representative of the quantity of material passing through the meter,
   (b) a second actuator operationally secured to and synchronized rotationally with a shaft, said second actuator rotationally driven by force received from said first actuator for transferring rotational force to the shaft,
   (c) a damping member in operative association with said first and second actuators such that the alternating acceleration and deceleration due to the eccentricity associated with the elliptic shape of the oval gear is smoothed to prevent excessive correction, instability or oscillatory conditions in the measured material.

2. A stabilizing apparatus for use with an oval gear meter as defined in claim 1 wherein said first actuator and said second actuator are first and second magnets, respectively.

3. A stabilizing apparatus for use with an oval gear meter as defined in claim 2 wherein
   (a) said first magnet is toroid-shaped, and
   (b) said second magnet is disposed within said toroid-shaped first magnet such that said second magnet moves in response to any movement of said first magnet.

4. A stabilizing apparatus for use with an oval gear meter as defined in claim 2 wherein said damping member operationally connects said second magnet and the shaft for damping the acceleration and deceleration associated with the movement of the oval gear such that vibration, wear and breaks in magnetic coupling are minimized.

5. A stabilizing apparatus for use with an oval gear meter as defined in claim 4 wherein said damping member is a spring.

6. A stabilizing apparatus for use with an oval gear meter as defined in claim 5 wherein said spring is helical having a first end and a second end with the first end secured to said second magnet and the second end secured to the shaft.

7. A stabilizing apparatus for use with an oval gear meter as defined in claim 3 wherein said damping member operationally connects said first magnet and the oval gear for damping the acceleration and deceleration associated with the movement of the oval gear such that vibration, wear and breaks in magnetic coupling are minimized.

8. A stabilizing apparatus for use with an oval gear meter as defined in claim 7 wherein said damping member is a spring.

9. A stabilizing apparatus for use with an oval gear meter as defined in claim 8 wherein said spring is helical having a first end and a second end with the first end secured to said second magnet and the second end secured to the shaft.

10. A stabilizing apparatus for use with an oval gear meter having one or more oval gears, the oval gear meter for receiving material such that a quantity of material is measured by the meter, such meter having the characteristic of alternating acceleration and deceleration for a constant flow of material passing through the meter due to the eccentricity associated with the elliptic shape of the oval gear thereby causing excessive instability or oscillatory conditions with respect to the measured material, the stabilizing apparatus comprising:
   (a) a first magnet having a toroid shape and operationally secured to and synchronized rotationally with an oval gear, said first magnet receiving rotational force from the oval gear representative of the quantity of material passing through the meter,
   (b) a second magnet having a toroid shape and operationally secured to and synchronized rotationally with a shaft, said second magnet disposed within said first magnet and rotationally driven by force received from said first magnet for transferring rotational force to the shaft,
   (c) a helical spring for dampingly connecting said second magnet and the shaft such that the alternating acceleration and deceleration due to the eccentricity associated with the elliptic shape of the oval gear is smoothed to prevent excessive correction, instability or oscillatory conditions in the measured material.

11. A stabilizing apparatus for use with an oval gear meter having one or more oval gears, the oval gear meter for receiving material such that a quantity of material is measured by the meter, such meter having the characteristic of alternating acceleration and deceleration for a constant flow of material passing through the meter due to eccentricity associated with the elliptic shape of the oval gear thereby causing excessive instability or oscillatory conditions with respect to the measured material, the stabilizing apparatus comprising:

(a) a first magnet having a toroid shape and operationally secured to and synchronized rotationally with an oval gear, said first magnet receiving rotational force from the oval gear representative of the quantity of material passing through the meter, (b) a second magnet having a toroid shape and operationally secured to and synchronized rotationally with a shaft, said second magnet disposed within said first magnet and rotationally driven by force received from said first magnet for transferring rotational force to the shaft, (c) a helical spring for dampingly connecting said first magnet and the oval gear such that the alternating acceleration and deceleration due to the eccentricity associated with the elliptic shape of the oval gear is smoothed to prevent excessive correction instability or oscillatory conditions in the measured material.

* * * * *